United States Patent [19]

Khan et al.

[11] Patent Number: 4,634,454

[45] Date of Patent: Jan. 6, 1987

[54] METHOD AND DEVICE FOR SEPARATION OF AN ISOTOPE MIXTURE OF HYDROGEN, EXISTING PREDOMINANTLY IN MOLECULAR AND/OR BOUND FORM IN A GAS CONTAINING FREE MATERIALS AND/OR OTHER MATERIALS IN COMPOSITION, FROM THE REMAINING COMPONENTS OF THE GAS

[75] Inventors: Imran A. Khan, Jülich, Fed. Rep. of Germany; Karl-Jürgen Dietz, Oxon, United Kingdom; Francoise Waelbroeck; Peter Wienhold, both of Jülich, Fed. Rep. of Germany

[73] Assignee: Kernforschungsanlage Jülich Gesellschaft mit beschränkter Haftung, Jülich, Fed. Rep. of Germany

[21] Appl. No.: 314,230

[22] Filed: Oct. 23, 1981

Related U.S. Application Data

[63] Continuation-in-part of Ser. No. 104,734, Dec. 18, 1979, abandoned.

[30] Foreign Application Priority Data

Dec. 18, 1978 [DE] Fed. Rep. of Germany ....... 2854638

[51] Int. Cl.⁴ ............................................. B01D 53/22
[52] U.S. Cl. ......................................... 55/16; 55/158; 55/208; 423/648 R; 423/DIG. 7
[58] Field of Search ........................... 55/16, 158, 208; 423/648 R, DIG. 7

[56] References Cited

U.S. PATENT DOCUMENTS

| | | | |
|---|---|---|---|
| 1,174,631 | 3/1916 | Snelling | 55/158 |
| 2,032,925 | 3/1936 | Ferguson | 423/648 R |
| 2,456,163 | 12/1948 | Watson | 55/158 X |
| 2,609,059 | 9/1952 | Benedict | 55/16 |
| 2,671,337 | 3/1954 | Hulsberg | 55/158 X |
| 2,824,620 | 2/1958 | DeRosset | 55/16 |
| 2,986,641 | 5/1961 | Michels | 55/158 X |
| 3,104,960 | 9/1963 | Chamberlin et al. | 55/158 |
| 3,241,298 | 3/1966 | Pierce | 55/16 X |
| 3,251,173 | 5/1966 | Ehlers et al. | 55/158 |
| 3,407,571 | 10/1968 | Sherwood | 55/158 |

FOREIGN PATENT DOCUMENTS 733079 3/1943 Fed. Rep. of Germany ........ 55/158

*Primary Examiner*—Robert Spitzer
*Attorney, Agent, or Firm*—Becker & Becker, Inc.

[57] ABSTRACT

A method and apparatus for separation of an isotope mixture of hydrogen, existing predominantly in molecular form and/or inbound form, from the remaining components of a gas. A first chamber is separated from a second chamber by a wall which is permeable for atomic hydrogen and less permeable for molecular hydrogen. The hydrogen is converted into atomic hydrogen or, if necessary, is separated in atomic form from the material with which the hydrogen has gone into chemical composition. A device electrically operable independently of the wall is provided for converting the molecular and/or bound hydrogen to form atomic hydrogen in apparatus for this purpose. A heating device for elevating the temperature of thread, wire, or body of other form capable of being heated above 1500 K is provided and such thread, wire, or body is made of high-melting material, such as tungsten, iridium, osmium, or rhenium. The permeable wall of material differing from palladium consists of iron, steel or nickel as well as nickel-base alloys.

3 Claims, 1 Drawing Figure

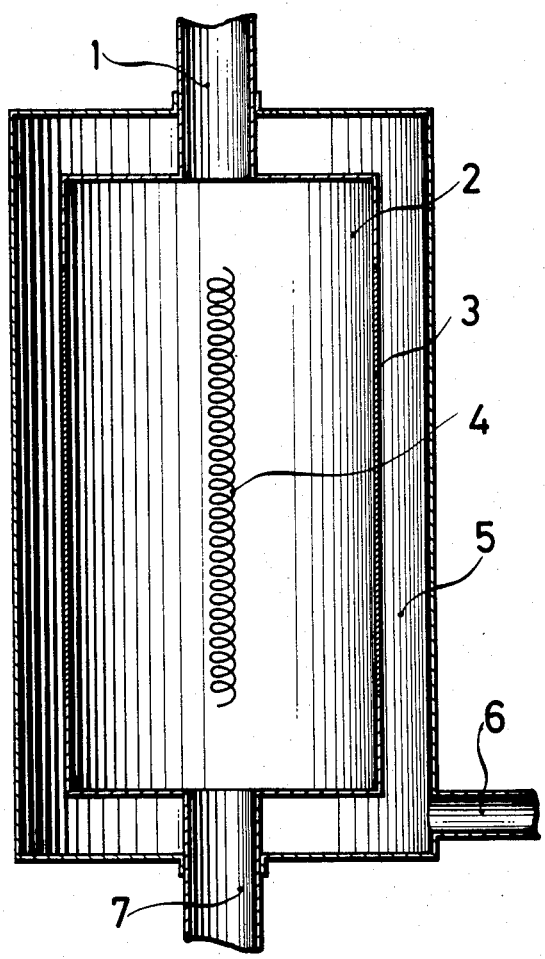

METHOD AND DEVICE FOR SEPARATION OF AN ISOTOPE MIXTURE OF HYDROGEN, EXISTING PREDOMINANTLY IN MOLECULAR AND/OR BOUND FORM IN A GAS CONTAINING FREE MATERIALS AND/OR OTHER MATERIALS IN COMPOSITION, FROM THE REMAINING COMPONENTS OF THE GAS

This is a continuation-in-part application of co-pending application Ser. No. 104,734—ALI-KHAN et al filed Dec. 18, 1979, now abandoned, belonging to the assignee of the present invention.

The present invention relates to a method and device or apparatus for separation of an isotope mixture of hydrogen, existing predominantly in molecular form and/or in bound form, from the remaining components of the gas, said isotope mixture existing in a gas containing free materials and/or other materials in composition therewith. Such a separation is sought in the technique for different purposes, especially for production of ultra pure hydrogen which is used with a series of procedural purposes.

Methods and apparatus for separation of hydrogen from gas mixtures have been known for a long time. Accordingly, there is known to undertake a separation of gaseous hydrogen from the remaining components of a gas by selective absorption by use of iron-titanium-alloys. Another known measure consists in the selective diffusion of hydrogen by means of a palladium membrane. With this method, the hydrogen diffuses through the palladium membrane while the remaining gas components are held back. The separation of hydrogen by selective liquefying of the gas mixture, in which the hydrogen is contained, also belongs to the state of the art. Under such circumstances, the hydrogen remains as the last component of the gas mixture, though such is the case only when the gas mixture does not contain any helium.

All measures belonging to the known state of the art for separating of hydrogen from gas mixtures have the disadvantage that they are capable of being carried out only in a discontinuous procedural manner with the exception of the selective diffusion using a palladium membrane. A further considerable disadvantage exists therein that with the previously known methods either the yield is small or the complexity necessary for carrying out that method is great.

The separation of hydrogen by use of a palladium membrane moreover has the advantage that such operation can be carried out continuously, however it is of disadvantage under such circumstances that special further measures are necessary to compress the separated hydrogen as it has proven necessary in a plurality of the cases. Aside therefrom, however, for compressing there have been used up to now mainly compressors with movable parts which require a lubrication so that an oil contamination of the separated hydrogen cannot be avoided or can be avoided only subject to very high additional complexity.

The object of the present invention is to create a method and apparatus, with which the disadvantages of the previously known methods are avoided, and which are characterized especially thereby that the separation of hydrogen from a gas mixture occurs continuously, that the presence thereof in helium is possible and that even hydrogen, which in chemical composition with other materials, is contained in the gas mixture, is capable of being separated so that these compositions, rather than being a burden for the method as contaminations, now actually contribute to increase of the economic feasibility. Additionally there is to be made possible by the method and apparatus of the present invention that the separated hydrogen is capable of being compressed to the pressure at which it is to be supplied for its utilization purposes without requiring subsequent connection of compressors with movable parts.

This object is resolved with a method of the initially indicated type in accordance with the teaching of the present invention such that the hydrogen available in molecular form and/or in bound form is, within a chamber capable of being closed on all sides and separated from a second chamber likewise closable on all sides by walls permeable for atomic hydrogen and permeable to a lesser degree for molecular hydrogen, converted into atomic hydrogen or, if necessary is separated from the material, with which the hydrogen has entered into a chemical composition, in atomic form, and after the permeation thereof through the permeable wall is collected in the second chamber while again molecular hydrogen is formed.

Under these circumstances, it is advantageous in a plurality of cases to proceed in such a manner that the measures for separating of hydrogen are carried out so long until the pressure in the separated hydrogen has attained a predetermined level or height above the partial pressure of the hydrogen in the gas from which the hydrogen is separated.

During application of these measures there is readily possible to attain pressures up to 20 bar in the separated gaseous hydrogen isotope mixture even when the partial pressure of the hydrogen gas in the gas mixture amounts to only $10^{-3}$ mbar, for example.

A very simple and advantageous apparatus for carrying out the method in accordance with the present invention consists therein that the apparatus includes two chambers closable by means of valves and being separated from each other by a wall permeable for atomic hydrogen and permeable to a lesser extent by molecular hydrogen; of the two chambers, the one chamber is connected with a supply line for gas from which the hydrogen isotope mixture is to be separated and the other chamber destined for catching or collecting the separated hydrogen isotope mixture is capable of being evacuated; the subdivided container has walls of a material not permeable or poorly permeable for hydrogen isotopes and also has a device arranged in the chamber connected with the gas supply for converting the molecular and/or bound hydrogen into atomic hydrogen.

Under such circumstances, the present invention proceeds on the basis of recognition that particular materials are permeable for hydrogen to a degree also sufficient for practical applications when the hydrogen in its gaseous condition generally existing in molecular or in bound form is first converted into atomic hydrogen. The present invention utilizes the fact that the atoms of hydrogen penetrating through the walls formed by such a material, after discharge from the walls, are combined to form molecules such that the hydrogen after penetration through the walls exists in molecular form in the gas chamber located therebehind. This has as a consequence that after penetration or passage of hydrogen through the walls made from such materials the molecular hydrogen formed in this manner cannot return through the walls or in any event only can return through the walls in a scope which is negligible in practice. Because of this fact, there is also made possible that the pressure in the chamber destined for catching or collecting the separated hydrogen can be elevated or increased to a pressure much higher than the partial pressure of the hydrogen in the gas mixture from which the hydrogen has been separated.

An effective apparatus embodied according to the present invention for continuous separation of a hydrogen isotope mixture from a gas consists therein that the chamber connected with the supply of source for the gas is connected by a valve with a discharge line for the residual gas left after separation of the hydrogen. Thus there is made possible that gas mixture, from which the hydrogen isotope mixture is to be separated, is supplied continuously to the chamber connected with the gas supply or feed line and the residual gas is withdrawn after the separation.

For converting of molecular and/or bound hydrogen into atomic hydrogen there can be provided known devices for contact dissociation, for generation of glow discharges, high frequency discharges or ionizing radiation, or also a device creating electric arcs. Also proven as very advantageous is that with the apparatus according to the present invention there is provided a thread, wire or body of other form of high melting material, such as wolfram, iridium, osmium, rhenium, which is capable of being heated to a temperature lying above 1500 K.

For increasing the permeation of passage through the wall permeable for atomic hydrogen it is advantageous that the permeable wall is capable of being heated to a temperature lying above room temperature whereby there has also been proven as especially advantageous that the permeable wall is capable of being heated to a temperature of 400 to approximately 800 K., since at these temperatures the permeation flux density is especially advantageous.

Under these circumstances, the selection of the magnitude of the temperature to which the permeable wall is heated up depends thereon which pressure is to be attained in the gas located in the collecting chamber. As has been shown, by increasing the temperature, the permeation flux or flow density may increase though simultaneously the magnitude of attainable pressure decreases. The permeation flux or flow density and the attainable pressure in the gas collected in the catching or collecting chamber additionally depend upon the selection of material for the permeable wall. Utilization of iron, as for example α-iron, steel, as for example a steel having a composition of ST 60 or an austenitic steel, or also nickel as well as nickel-base alloys have proven advantageous.

A very advantageous embodiment of the apparatus in accordance with the teaching of the present invention which makes possible a very uniform encountering or engaging of the wall permeable for atomic hydrogen consists therein that the chambers are arranged coaxial to each other, whereby the thread, wire or body of any other form which is difficult to melt, is provided in the common axis of the chambers and the permeable wall is embodied as a hollow cylinder surrounding in spaced relationship the body of high melting material.

This object, and other objects and advantages of the present invention, will appear more clearly from the following specification in connection with the accompanying drawing in which:

The drawing represents a schematic illustration of a sample embodiment of the device in accordance with the present invention which is described in greater detail in the following paragraphs.

The gas mixture containing the isotope mixture of hydrogen is introduced into a chamber 2 by way of a supply line or conduit 1 closable by way of a valve, not illustrated in the drawing. The chamber 2 is cylindrical in configuration whereby a part of the cylinder wall 3 is permeable for hydrogen atoms. In the axis of the cylindrical chamber 2 there is arranged a thread or wire 4 of a high melting material, as for example tungsten, of which the length corresponds to the length of that part of the wall of the cylinder which is permeable for atomic hydrogen and which is capable of being heated to a temperature up to approximately 2000 K. by means of a heating device not further illustrated in the drawing. The cylindrical chamber 2 is coaxial with and surrounded coaxially by a chamber 5 which is provided for catching or collecting the hydrogen which is contained in molecular and/or bound form in the gas mixture of the chamber 2, then is converted by means of the wolfram or tungsten wire or thread into atomic hydrogen and after permeating or passing through the part 3 of the wall of the cylindrical chamber 2 permeable for the atomic hydrogen, is undergoing a transition into the molecular form.

As recognizable in the drawing, the gas introduced through the supply line or conduit 1 into the cylindrical chamber 2 passes the wire or thread 4 of wolfram or tungsten. The molecular and/or bound hydrogen contained in the introduced gas mixture is converted thereby into atomic hydrogen and, after penetration or passing through the permeable wall, comes into the chamber 5. After recombination respectively of two hydrogen atoms into hydrogen molecules, the hydrogen remains in the chamber 5, which is capable of being connected to a device for evacuating purposes but not illustrated in further detail in the drawing, so long until, after attaining a predetermined pressure, it is withdrawn or removed from the chamber 5 by way of a discharge line or conduit 6. The residual gas left after passing the thread or wire 4 of wolfram or tungsten is withdrawn from the chamber by means of a discharge line or conduit 7 connected with the chamber 2 and capable of being closed by a valve (not illustrated in the drawing) so that the device or apparatus according to the present invention can be operated continuously by way of continuous supplying and discharging of gas mixture from which the hydrogen is to be separated. Simultaneously the pressure in the chamber 5 can be increased consequently to a level or magnitude up to a value sufficient for many uses or applications.

1. First sample embodiment

A steam-hydrogen isotope mixture consisting of 1% steam and 99% hydrogen was introduced into a previously evacuated chamber 1 of a device or apparatus in accordance with the present invention, whereby the gas mixture existed at a pressure of $4.6 \times 10^{-4}$ mbar. The wolfram or tungsten thread used therewith had a total upper surface of 0.3 cm$^2$ and was heated up to a temperature of 2000 K. with an output of 13 W. α-iron was used as the material for the wall permeable for the atomic hydrogen. The permeable wall had a thickness of approximately 1 mm, the entire surface thereof amounted to 100 cm$^2$. The temperature thereof was approximately 470 K. There was obtained through the permeable wall a suction capacity of 0.3 liters per second for hydrogen into the previously evacuated collecting chamber 5. The pressure of the hydrogen collected in the catching or collecting chamber amounted to approximately 200 mbar with a chamber volume of 0.1 liters after an operating duration of approximately 90 hours.

2. Second sample embodiment

For a gas mixture of helium and tritium with a partial pressure of 3 mbar for helium and a partial pressure of $10^{-3}$ mbar for tritium—representing a gas composition which corresponds to that after relaxation or expansion in a primary cooling circuit of a gas cooled high-temperature reactor—the passage of tritium is 0.1 g per day and the maximum attainable pressure amounts to 1.6 bar subject to utilization of a wolfram or tungsten thread with a surface of 20 cm$^2$ and a temperature of 2000 K. with an electrical capacity of 1.3 kW as well as a permeable wall of α-iron with a thickness of 1 mm.

A U.S. Pat. No. 3,407,571—Sherwood dated Oct. 29, 1968 discloses an apparatus for separation of hydrogen with which only the open spaces with the known apparatus are closed-off on both sides by way of a hydrogen-permeable membrane; actually the Sherwood U.S. Pat. No. 3,407,571 teaches the utilization of a separating wall or membrane of a material which is very well permeable for an atomic hydrogen though however being practically impermeable for molecular hydrogen and the separating wall or membrane can comprise for example conventional steel. Additionally, such a membrane comprising mechanically solid and relatively inexpensive or moderately priced material or providing a separating wall according to the Sherwood Patent on the gas entry side is equipped with a coating or layering of palladium or palladium-alloy which is to assure a dissociation of the molecular hydrogen into atomic hydrogen.

The entire apparatus operates at a pressure difference between the chambers or spaces on both sides of the membrane amounting to at least 10 psi and preferably 20 to 1500 psi (see the last and next to the last line of column 2 of the Sherwood U.S. Pat. No. 3,407,571).

The essential difference of the present invention comprises or now exists therein that, compared with the Sherwood U.S. Pat. No. 3,407,571, now *no* palladium coating or layering is provided (which would even be damaging or detrimental), but rather the present invention provides an apparatus preferably to be operated electrically independently of the wall for creation or generation of atomic hydrogen from hydrogen compounds. Examples for such devices are set forth by the present disclosure based upon a dissociation at high temperatures (above 1500° K.) by glow-discharge or high frequency discharge or also ionizing radiation. The device is to be electrically operated since atomic hydrogen for instance also can be created or generated by ionizing radiation (in other words without electrical connections).

For the purpose of distinguishing as clearly as possible over the previously known apparatus which predominantely operates with membranes of palladium or palladium alloying or at least operating with a coating or layering of palladium or palladium alloys there is desirable and purposeful with the present invention that a separating wall or membrane is used comprising a material which *differs from palladium*.

With the present invention, operation occurs with a device independently of the separating wall for creation or generation of atomic hydrogen from hydrogen compounds (such as molecular hydrogen) upon the side to engage with a hydrogen-containing gas mixture as well as being permeable for atomic hydrogen but being a membrane which is extensively impermeable for molecular hydrogen and still further comprising a material different from palladium so that there is attained in a surprising manner a hydrogen permeation increased by magnitudes (permeation through the separating wall) which is so effective that no driving pressure difference is necessary between the spaces or chambers on both sides of the membrane. Furthermore, to the contrary, a hydrogen-pressure increase is attained upon the discharge or outlet side of the membrane compared with the inlet or entry side thereof.

Such an unexpected advantageous manner of operation which additionally gets along without the expensive palladium is not in any way shown or suggested by the Sherwood U.S. Pat. No. 3,407,571 and the additionally known prior art just as ineffective as to the teaching, showing or suggestion thereof.

Distinctions exist for the present invention first of all on the basis of the definition of the separating membrane made of a material differing from palladium as well as secondly involving the definition of the dissociation-apparatus as an apparatus to be operated preferably electrically independently of the separating membrane or wall such that a recognizable difference exists for the teaching of the present invention even compared with the apparatus of the Sherwood U.S. Pat. No. 3,407,571.

The U.S. Pat. No. 3,104,960—Chamberlin et al dated Sept. 24, 1963 shows a device or apparatus with which the separating membrane is made of palladium and with which the tungsten (wolfram) threads within the palladium membrane do not serve for dissociation of the molecular hydrogen but rather only being provided as a heating element for heating up the palladium membrane in order to increase the hydrogen permeability thereof. The (membrane) temperatures provided conventionally for increasing the hydrogen permeability of such membranes are known to lie or exist at approximately 400° K. to 800° K.

The temperatures necessary for a successful dissociation of a tungsten (wolfram) thread as provided according to the present invention lie in contrast above 1500° K., accordingly quite apparently outside the range which would be applied or utilized with the apparatus according to the Chamberlin et al U.S. Pat. No. 3,104,960 in order to heat up the adjacent or adjoining palladium wall to 400° K. to 800° K.

Examples for the inventively utilized materials for the separating membranes are set forth in the description to include iron, steel, nickel, nickel alloys but not however in any way mentioning palladium.

The U.S. Pat. No. 3,251,173—Ehlers et al dated May 17, 1966 discloses a hydrogen purification or cleansing with which within a cylindrical container a multiplicity of palladium pipes or tubes are provided for discharging or carrying away the hydrogen diffused therethrough and being brought to an increased or elevated temperature by way of a heating element 18 which enhances the hydrogen permeation. There is not apparent at any location that by way of the heating element 18 any dissociation of the molecular hydrogen into atomic hydrogen is to be attained (for which then temperatures above 1500° K. would be necessary). A heating to such high temperature is non-conventional if not especially set forth or mentioned.

By way of limitation in a desired sense to membranes made of material differing from palladium there is additionally attained also a considerable distinction of the present invention over the state of the art represented by Ehlers et al U.S. Pat. No. 3,251,173.

In the U.S. Pat. No. 2,824,620—DeRosset dated Feb. 25, 1958 there may be mentioned that metals such as iron, nickel, copper, platinum, molybdenum as well as alloys thereof differing from palladium are useable as hydrogen permeable membranes. The DeRosset U.S. Pat. No. 2,824,620 however also prefers palladium since in a thin layer, supported by a porous sinter body palladium is to be used in order to increase the passage or permeability of the hydrogen therethrough. Even though possibly materials as set forth differing from palladium are listed as hydrogen permeable there is respectfully stressed that in the DeRosset U.S. Pat. No. 2,824,620 in no way is there asserted that a successful hydrogen separation would be possible solely with membranes made of such materials. The practical testing or attempt would also teach that the efficiency of such materials for the hydrogen permeation even at elevated temperatures remains far behind that of palladium.

At first and not until the present inventive combination of the membrane of a material permeable for hydrogen (which according to the desired limitation should differ from palladium) with a device or apparatus provided upon the hydrogen supply or feeding side for generation of atomic hydrogen leads to an extraordinarily effective hydrogen separation which by far exceeds what up to now was possible, according to the previously known proposals.

From the German Pat. No. 733,079—Rindtorff issued Mar. 18, 1943 there is recognizable a gas separation procedure which in essence is based upon thermo-diffusion which additionally is combined with a diffusion by way of porous walls for increasing the separation effect.

For bringing about the thermo-diffusion the heating rod 1 is provided inside a cylindrical device or apparatus which is heated to approximately 600° C. (see page 2, left column, line 47 of the German Pat. No. 733,079). This central heating rod is accordingly in no way to be considered as a device for creation or generation of atomic hydrogen. Consequently the teaching of the present invention also is not made obvious by way of the German Pat. No. 733,079.

The present inventive method and/or apparatus for separation of hydrogen relates to a single unique invention, namely the separation of hydrogen from a gas mixture supplied from one space or chamber 1 into a space or chamber 2 which is separated from the chamber 1 by a hydrogen permeable membrane whereby within the chamber 1 a device or generation or creation of atomic hydrogen is provided independently of the membrane.

According to the Sherwood U.S. Pat. No. 3,407,571, a separating wall is used for the separation of hydrogen from gas mixtures and this separating wall must be coated or plated with palladium on the side of the gas mixture. This palladium layer is to assure for the dissociation of hydrogen molecules into atomic hydrogen which then passes through the wall (for example in steel) located therebelow and providing a framework therewith.

According to the present invention, in comparison, there is utilized a separating wall which is not to include any palladium and furthermore differing from the Sherwood Patent utilizing a device (as for example particularly a heating coil or spiral) with which molecular hydrogen in the gas chamber is converted into atomic hydrogen.

Through the present invention there is attained a considerable advantage since the hydrogen dissociation in the gas chamber together with the diffusion of atomic hydrogen transpires essentially more efficiently through a corresponding membrane than the diffusion of the hydrogen through a wall layered or coated with palladium as provided according to the Sherwood Patent disclosure. More particularly according to the present invention, aside therefrom that expensive palladium is made completely superfluous, there can be operated with a very nominal hydrogen content of the gas mixture which content readily can lie for example at $10^{-5}$ bar, while according to the Sherwood patent disclosure preferably pressure differences between the chamber of the gas mixture and the chamber 2 located behind the separating wall can be applied or utilized having values of approximately 20 to 1500 psi (approximately 1.4 to 200 bar). Additionally according to the present invention there is even attained a predetermined or particular pump effect with the result that the hydrogen pressure in the chamber 2 can be considerably higher than in the chamber 1.

The advantages which are attained according to the present invention at the time of the Sherwood patent disclosure could have been readily attained if the invention had been obvious to an average man skilled in the art since the hydrogen dissociation on a glow wire has been known for a very long time (see I Langmuir, J. Am. Chem. Soc. 34 (1912) 860-77 as well as 37 (1915) 417-58). This possibility of the dissociation of molecular hydrogen also has not in any way been forgotten in the past as apparent from the article of T. W. Hickmott J. Chem. Phys. 32 issue 3 (1960) 810 etc. about the hydrogen dissociation on glow wires or threads.

The fact that the present invention represents a non-obvious advance in the art is strengthened and reinforced additionally thereby that even in more recent times still the arrangement of Sherwood, namely the layering or coating of a non-precious separating wall with palladium is recommended as a possibility for a through-passage of hydrogen.

Even though the apparatus differences between the invention and the Sherwood patent disclosure upon cursory consideration only may appear to be slight or nominal, there is stressed that the teaching of the present invention has considerable meaning which results therefrom that through the inventive modification there is attained a differing through-passage mechanism which brings about considerable advantages.

To emphasize the difference and inventive quality of the novel separating method for hydrogen, reference can be made to accompanying diagrams comparing the features of the present invention with those of the Sherwood patent disclosure schematically; essential differences and advantages are summarized by this comparison to emphasize the salient points and features of the present invention.

The present invention is, of course, in no way restricted to the specific disclosure of the specification and drawing, but also encompasses any modifications within the scope of the appended claims.

What we claim is:

1. A method of separating hydrogen from the remaining components of a gaseous mixture, said hydrogen existing predominantly in a molecular bound form selected from the group consisting of molecular hydrogen and gaseous hydrogen compounds, which method includes in combination the steps of:

providing a first chamber which is capable of being closed on all sides and supplying said hydrogen containing gaseous mixture into said first chamber;

providing a second chamber which is capable of being closed on all sides;

separating said chamber by a wall consisting of material which is permeable for atomic hydrogen and less permeable for molecular hydrogen;

converting said molecular bound hydrogen into gaseous atomic hydrogen in the gas space of said first chamber, by a dissociating device operating separate from said wall;

allowing said atomic hydrogen to permeate said wall into said second chamber;

collecting said hydrogen recombining to molecular hydrogen while leaving the wall in said second chamber; and carrying out said method until the pressure in the separated off hydrogen reaches a predetermined level greater than the partial pressure of said hydrogen in said gas from which it is separated.

2. The method of claim 1 wherein the converting device is a wire heated to a temperature in excess of 1500° K.

3. The method of claim 2 wherein said partition is heated to a temperature in the range of 400° K. to about 800° K.

* * * * *